Dec. 12, 1939.  O. K. BUTZBACH ET AL  2,183,485

TRANSMISSION

Filed Dec. 24, 1937   3 Sheets-Sheet 2

INVENTOR.
Orville K. Butzbach and Harold E. Churchill
BY Walter E. Schirmer
ATTORNEY.

Dec. 12, 1939.   O. K. BUTZBACH ET AL   2,183,485
TRANSMISSION
Filed Dec. 24, 1937   3 Sheets-Sheet 3

INVENTOR.
Orville K. Butzbach
BY and Harold E. Churchill
Walter E. Schirmer
ATTORNEY.

Patented Dec. 12, 1939

2,183,485

UNITED STATES PATENT OFFICE 2,183,485

TRANSMISSION

Orville K. Butzbach and Harold E. Churchill, South Bend, Ind., assignors to The Studebaker Corporation, South Bend, Ind., a corporation of Delaware Application December 24, 1937, Serial No. 181,491

14 Claims. (Cl. 192—3.6)

This invention relates to transmissions and more particularly to transmissions embodying overdrive mechanisms embracing a planetary gear system adapted to automatically engage in response to predetermined speed relation between the driving and driven gears of the transmission mechanism.

While overdrive mechanisms in connection with automatic transmissions have proven of great benefit in lowering engine speeds and vibration during the engagement of the overdrive thereby creating a smoother and quieter ride at high speeds, they have the disadvantage of decreasing, to an appreciable extent, the accelerative characteristics of the vehicle due to the inverse ratio of motor speed to propeller shaft speed and consequently the quick pick-up or acceleration desired under traffic conditions is lacking. For example, in country driving the operator of an automobile frequently finds himself behind a slower moving vehicle when on-coming traffic prevents him from passing. His speed may drop down to 40 or 45 miles per hour and when an opportunity presents itself with the car still in overdrive he finds the lack of acceleration under such conditions makes such passing extremely hazardous. This may result in serious accidents or force the operator to remain behind the slowly moving vehicle for an unnecessary period of time.

The present invention has as its primary object the providing of control mechanism for locking the overdrive into a unitary mass while simultaneously effecting a direct drive through the transmission whenever traffic conditions are such as to require the normal acceleration or pick-up for passing vehicles in traffic. This control mechanism is also effective to restore the overdrive whenever desired by the operator.

While previous mechanisms of this type have been developed which are fully automatic in operation and may be controlled solely by predetermined actuation of the accelerator pedal, such mechanisms have not proven entirely satisfactory. As far as we are able to determine, this is due mainly to the necessity of maintaining a certain nicety of balance between the various shifter speeds and the centrifugally controlled clutching and declutching mechanisms. Under certain speed conditions and acceleration requirements difficulty has been encountered to restore direct drive required for acceleration thereby increasing the hazards because of the inability of the average operator to ascertain whether or not the mechanism will function in a specific manner under given conditions.

We propose in the present invention to provide a planetary system for overdrive which has a sun gear normally locked against rotation so that the drive from the output shaft of the transmission passes through the planetary gear system and thus provides the overdrive required. This mechanism is operated by the employment of a free wheeling clutch mechanism under the manual control of the operator which, when engaged, allows the overdrive mechanism to come into operation when the vehicle speed exceeds the engine speed by a predetermined extent. After the overdrive has been effected and the vehicle is progressing under such drive the operator may, whenever conditions so require, manually release the sun gear for rotation thus rendering the overdrive inoperative and throwing the vehicle back into direct drive. This operation locks the vehicle in direct drive until such time as the operator depresses his clutch pedal and releases the control mechanism whereby the overdrive is then automatically reinstated as the parts come into proper alinement and synchronism.

It is one of the main objects of the present invention to provide a control mechanism associated with an overdrive system of this type which is under the direct manual control of the operator and can be actuated whenever it is desired to make use of the acceleration characteristics of the vehicle for any purpose.

Another object of the present invention is to provide such control mechanism which can be assembled on the transmission housing and may be operated from a remote point such as the vehicle instrument board through flexible cable connections.

A still further feature of the present invention is the provision of an oscillating mechanism associated with the sun gear locking means whereby the restoration of overdrive is conditioned upon the proper alinement of the parts of this oscillating mechanism so that overdrive will be effected only when the various elements of the transmission are in proper condition.

In this connection we preferably employ a locking pawl which is adapted to lock the sun gear to an oscillating member to retain the sun gear against rotation. The oscillating member is confined by resilient means in position with respect to a fixed part of the housing in such a manner that upon manual withdrawal of the pawl the oscillating member actuates suitable means for holding the pawl against accidental reengagement. This same oscillating member is effective upon release of the manual operating means to condition predetermined parts of the mechanism for relocking of the sun gear in fixed position.

Another feature provided by the present invention is the employment of control means for the overrunning clutch mechanism whereby the free wheeling portion of the overdrive can be conditioned for operation prior to starting of the vehicle and will automatically move into proper operating position during the normal shifting movements necessary to bring the vehicle up to speed. This is accomplished by means of the energy storing mechanism whereby the free wheeling clutch is normally biased into operating position but is restrained from such position until a clutching operation allows the driving and driven portions of the transmission to move into predetermined speed relationships.

Still another feature of the present invention is the provision of a centrifugally operated clutching device for cutting the overdrive into operation only after the free wheeling clutch has moved into its operating position and which remains in actuated position during the period that the operator locks out the overdrive to gain the benefit of rapid acceleration.

Another advantage secured by the present invention is the provision of a simplified latching mechanism associated with the clutch pedal for retaining the pawl actuated mechanism in operative position to prevent accidental reengagement of the pawl during the period that acceleration is required in direct drive and which is readily releasable upon depression of the clutch to allow reinstatement of the overdrive.

Still another feature of the invention resides in the compact arrangement and mounting of the parts incident to the control mechanism so that they require a minimum of space and can be disposed in such position as to require no redesigning of the transmission construction or the mounting therefor.

Other objects and advantages of the present invention such as the economy and simplicity of design of the manual control mechanism, will be readily apparent from the following detailed description which, taken in conjunction with the accompanying drawings, will disclose to those skilled in the art the particular construction and operation of a preferred form of the present invention.

Figure 1:
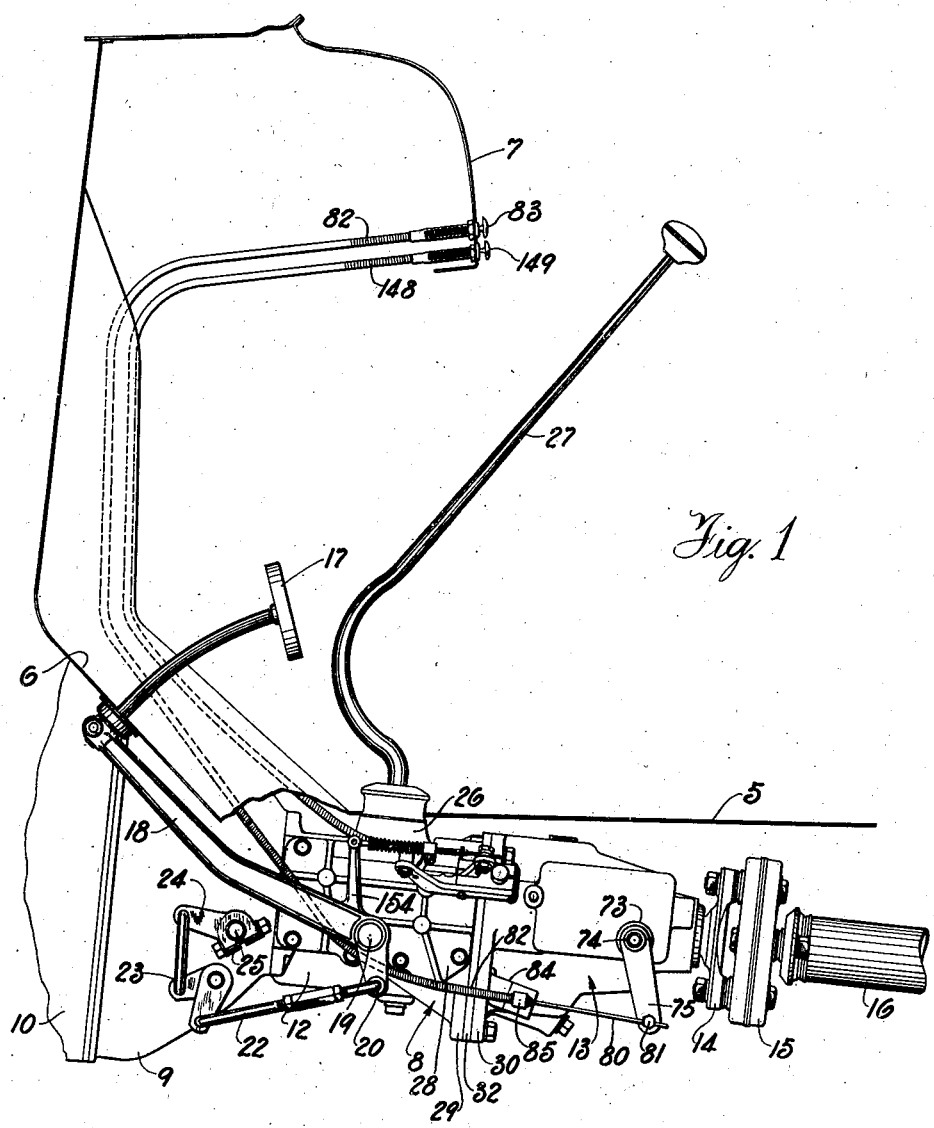
Figure 1 is a side elevational view of a transmission and associated parts of a vehicle embodying the present invention.

Referring now in detail to the drawings, we have disclosed in Figure 1 a portion of an automotive vehicle including the front floor 5, the inclined foot board portion 6, and the instrument panel 7. Mounted below the foot board and floor portion we provide the transmission indicated generally at 8 which at its forward end is secured to the bell housing 9 enclosing the clutch mechanism, this bell housing in turn being piloted in the fly wheel housing of the engine indicated generally at 10.

It will be noted that the transmission housing 8 consists of two parts, the conventional change speed transmission portion being indicated at 12 and the housing for the overdrive mechanism being indicated generally at 13. Extending axially from the housing enclosing the overdrive mechanism is a drive shaft having a companion flange 14 which is secured through the universal coupling 15 to a propeller shaft or torque tube 16 leading to the rear axle assembly. Extending through the foot board portion 6 in the forward portion of the vehicle is the clutch pedal 17 which is connected through the arm 18 to a stud pivot 19 carried on the side of the transmission housing, the arm 18 being in effect a bell crank lever having the opposite end thereof connected as at 20 to an adjustable link 22 leading through suitable linkage 23 to the arm at 24 connected to the clutch operating shaft 25 projecting through the side of the clutch housing.

The transmission 12 may be of the type shown more in detail in the copending application of Leo O. Burt, Serial No. 173,312, filed November 8, 1937, and in such case differs from conventional transmissions in that it is mounted on what might be termed its side with the gear shift lever supporting pedestal 26 extending from the top wall thereof at one lateral edge through the floor board 5 and providing a universal support for the gear shift lever 27. The housing 12, in the present embodiment of the invention, is provided with a side plate 28 which may be removed to allow inspection of the shifter mechanism and the gears and other cooperating portions of the transmission and at its rear end is provided with a flanged portion 29 to which is secured the flange 30 of the overdrive housing 13, there being an adapter plate 32 interposed therebetween.

Inasmuch as the present invention is not concerned primarily with the details of the change speed mechanism, it is not believed necessary to describe the same in detail herein and reference should be made to the above mentioned copending application for a fuller description of the transmission itself. The particular features of novelty of the present invention are in no way dependent upon the type of transmission mechanism incorporated in the housing 12 and it is to be understood that the present invention may be applied to any standard type of conventional change speed transmission which may be employed in the automotive field.

Figure 2:
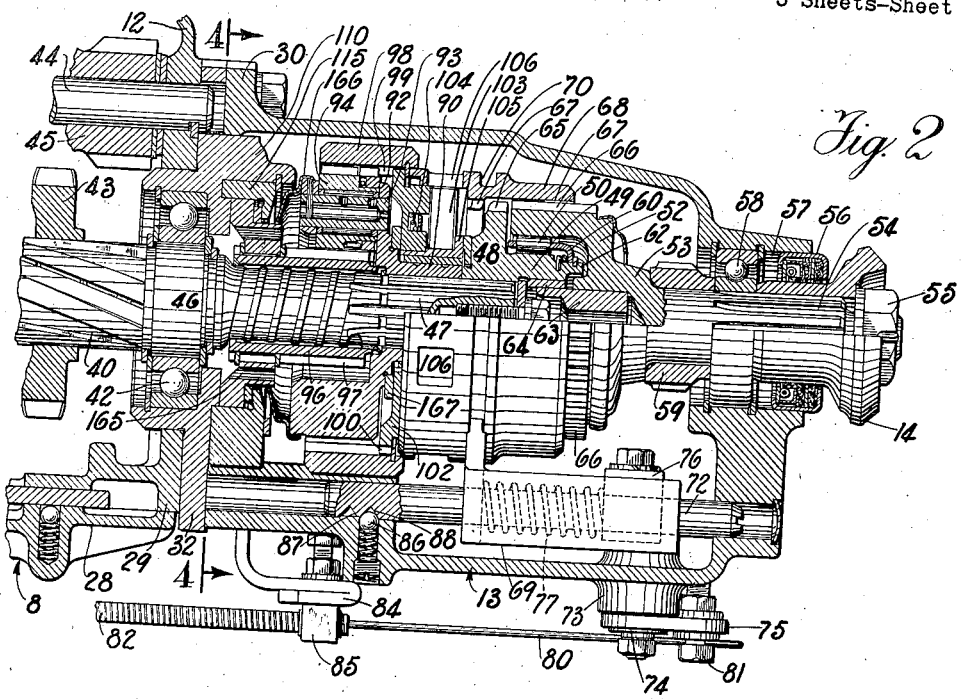
Figure 2 is a transverse sectional view through the rear portion of the conventional transmission, overdrive and free wheeling mechanism.
Figure 3:
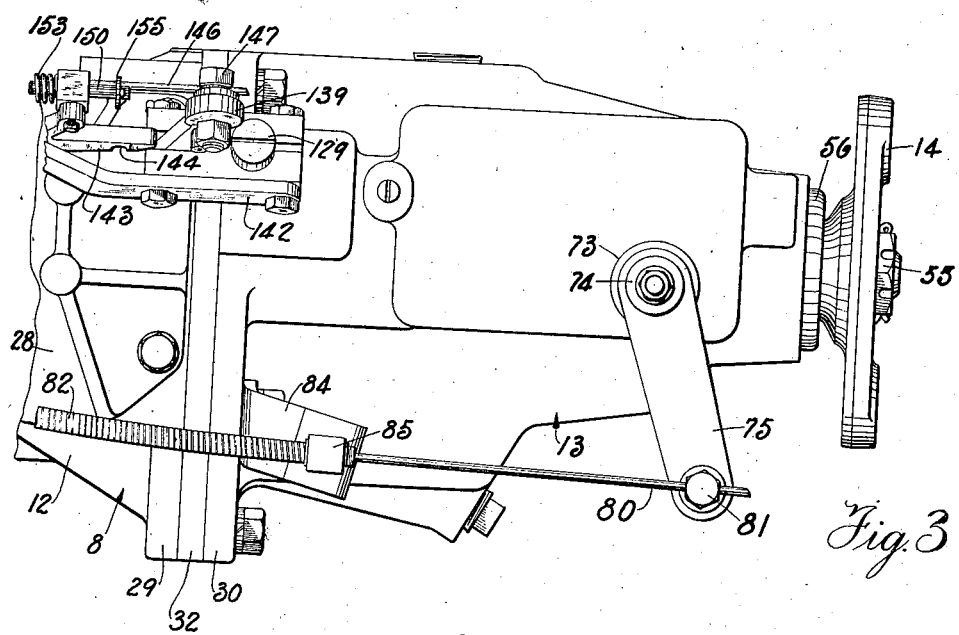
Figure 3 is an enlarged elevational view of that portion of the transmission including the control mechanism and its associated latching means.

Considering now Figures 2 and 3 in detail, it will be noted that the main shaft 40 of the transmission is suitably journaled in bearings 42 carried in an axially extending recess formed in the adapter plate 32 and located in the end flange 29 of the housing 12. The shaft 40 is provided with helical splines thereon on which is mounted the gear 43 which is adapted to be shifted axially by the gear shift lever 27 to effect certain of the gear ratios for driving the shaft 40. A counter shaft 44 in the housing 12 is adapted to serve as a support for the idler gear 45 forming an additional portion of any desired conventional transmission mechanism.

The shaft 40 has an extending portion 46 which projects for an appreciable distance into the housing 13 and is provided with a splined end 47 on which is mounted a clutch member 48 which is adapted to be conjointly rotated with the shaft 47. The member 48 has an extending cylindrical hub portion 49 which about its outer annular surface forms a race for receiving the anti-friction members 50 providing an overrunning clutch between the member 48 and a second clutch member 52 which is mounted thereon and which has a reduced axially extending portion 53 terminating in a splined end or shaft portion 54 adapted to receive the companion flange 14 of the universal joint connection to the propeller shaft, the flange 14 being held in position by the lock nut 55 threading over the projecting end of the splined portion 54. Suitable oil sealing means 56 is disposed about the hub of the flange 14 within the journal opening 57 formed in the rear end of the housing 13, and the member 52 and shaft 54 are journaled for rotation in the bearing members 58 locked in position in the journal portion of the housing. Mounted about the reduced portion 53 of this member is a small gear 59 serving as a means for driving any suitable speed indicating means such as a speedometer or the like.

The anti-friction members 50 forming the overrunning clutch between the members 48 and 52 are held in position by means of a retaining member 60 which is suitably locked in position on the extending end 62 of the member 48 and thus form a free wheeling mechanism for the transmission. The member 48 is coaxially centered with respect to the member 52 by means of the bushing 63 and the bronze bearing ring 64 interposed between the inner end of this bushing and the inner end of the surface portion of the member 48.

It will be noted that the gear teeth 65 of the clutch 48 and the external clutch teeth 66 formed on the member 52 are in substantial alinement and are adapted to be clutched together by the spaced sets of internal teeth 67 carried by the free wheeling clutching sleeve 68. This sleeve is adapted to have axially sliding movement with respect to the members 48 and 52 by means of the shifter fork 69 having a yoke or fork portion engaging in the annular groove 70 formed in the external surface thereof. The sleeve 68 is axially shiftable by axial movement of the shifter arm 69 secured to the shifter rod or shaft 72 which is suitably journaled for longitudinal movement in the housing 13. It will be noted that the side wall of the housing is provided with a boss portion 73 adapted to receive a shaft 74 which externally of the housing has secured thereto the operating crank 75 and within the housing has secured thereto a rocker arm 76 adapted to have sliding movement on the shaft 72 and normally held in inoperative position by means of the coil spring 77 encircling the shaft and biased at its opposite end against the normally extending portion of the shifter fork. The arm 75 is adapted to be rotated, to effect compression of the spring 77 and therefore place a biasing pressure upon the shifter fork 69 to disengage the clutch teeth 67 from the clutch teeth 65 of the member 48, by means of a flexible motion transmitting member comprising the cable 80 secured by means of the lock bolt 81 to the lower end of the arm 75 and extending through the protecting conduit 82 beneath the floor boards 6 to a control button 83 supported on the instrument panel 7. At its lower end the conduit 82 is supported in position relative to the housing 13 by means of a bracket 84 secured at one end to the flange 30 of the housing and bent outwardly to receive the supporting clamp or bracket 85 to which the end of the conduit is connected.

The shifter rod 72 is normally held in inoperative position by means of the spring detent member 86 engaging in the notch 87 formed adjacent one end of the rod but under pressure of the spring 77 upon actuation of the crank 76 the rod is urged to the left as viewed in Figure 2 to effect axial movement of the sleeve 68 to disengage the teeth 67 from the teeth 65 and therefore results in free wheeling drive. Under such conditions, as shown in Figure 2, the detent 86 engages in a second notch 88 to hold the sleeve 68 in shifted position.

It will be noted that the splined portion 47 of the shaft 40 is also adapted to receive the hub portion 90 of a planetary gear housing member having a radially extending portion 92 serving as a support for the stub shafts 93 upon which the planetary gears or pinions 94 are mounted by means of roller bearings. The member 92 is adapted to support a plurality of such pinions at circumferentially spaced points and these pinions are adapted to engage a sun gear 96 rotatably mounted about the portion 46 of the shaft 40. The sun gear is provided with gear teeth 97 in meshing engagement with each of the pinions 94 and is normally held in nonrotative position with respect to the housing by means to be hereinafter described.

Surrounding the planetary assembly is a cylindrical member 98 having internal teeth 99 in meshing engagement with the planetary gear teeth and also in engagement with the external teeth 100 of a housing member 102 which is adapted to carry a plurality of radially movable pawls 103. These pawls are normally held against vibration or rattling by means of a spring 104 located within an axially extending recess in the member 102 and are normally held against radially outward movement by spring mechanism which is not shown. The member 102 together with a cooperating closure member 105 form a housing for centrifugally operated pawls 103 and this housing is normally rotated at a speed proportional to that of the shaft 40 through the planetary housing 92 and the encircling member 98 to which the periphery of the housing member 102 is connected through teeth 99 and 100.

It will be noted that the clutching sleeve 68 of the free wheeling mechanism is provided with an axially extending annular portion having a plurality of openings 106 formed therein. These openings 106 are adapted to receive the pawls 103 when the pawls are forced outwardly against a predetermined spring pressure by centrifugal force due to the speed of rotation of the housing 102. As the pawls move into these openings they serve to lock the members 98, 102 and 105 to the sleeve 68 and consequently lock this entire mechanism to the clutch member 52 and thus to the propeller shaft. However, it will be noted that until the sleeve 68 is shifted to its innermost position there is no possibility of the pawls 103 moving radially outwardly and consequently the transmission must be placed in free wheeling condition prior to the time that the pawls 103 can lock the sleeve 68 to the driven member 98 of the planetary system in order to gain the benefits of the overdrive mechanism.

Figure 4:
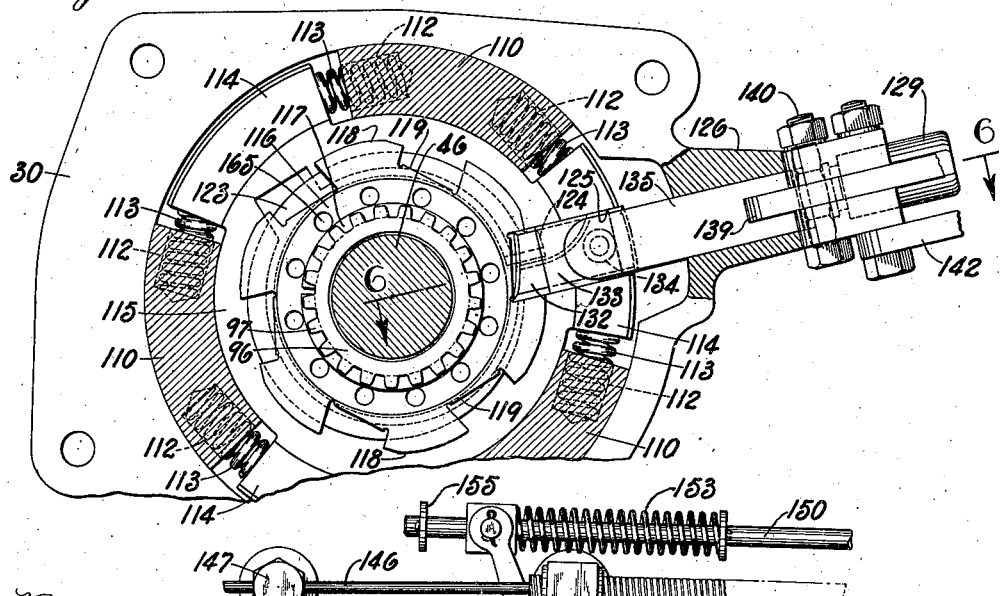
Figure 4 is a sectional view taken substantially on the line 4—4 of Figure 2 showing the sun gear locking mechanism in locked position.
Figure 6:
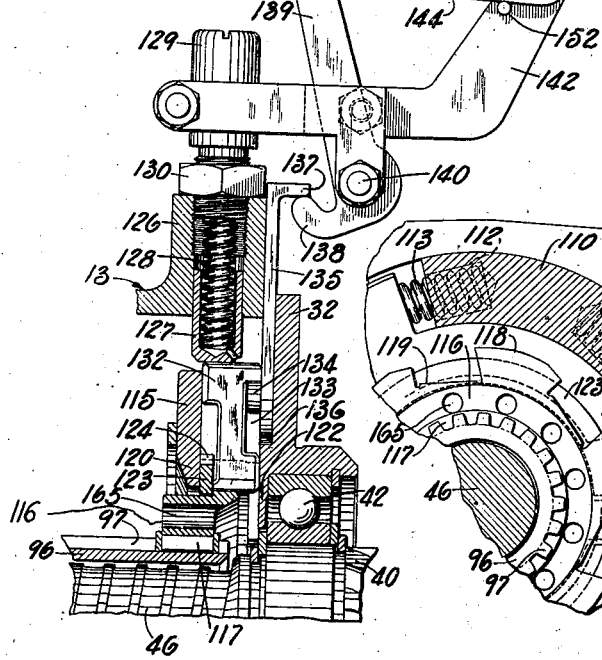
Figure 6 is a transverse sectional view taken substantially on line 6—6 of Figure 4 showing the details of the locking pawl mounting and latch mechanism.
Figure 5:
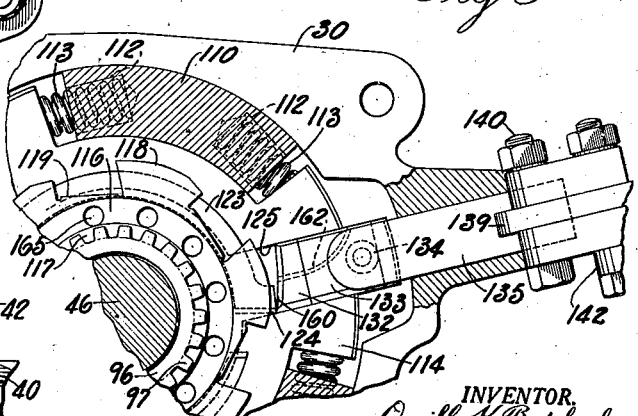
Figure 5 is a view corresponding to Figure 4 showing the locking pawl in disengaged position.

Considering now the manner in which the sun gear 96 is controlled to effect selective control of the overdrive mechanism which includes the planetary gears 94 and the driven gear 98, reference is made to Figures 4, 5 and 6.

The adapter plate 32 which is clamped between the housings 12 and 13 is provided with a series of axially directed bosses or lug portions as indicated at 110. Each of these lug portions is provided with recesses extending inwardly from the end faces thereof as indicated at 112 which are adapted to receive one end of the coil spring members 113, the opposite ends of the spring members 113 being seated in similar recesses formed in the lug portions 114 of the oscillating member 115. This oscillating member 115 is provided with 3 such radially extending lug portions 114 which are of an arcuate length such that a slight clearance is provided between the ends of the portions 114 and the ends of the portions 110, thereby providing for slight oscillation of the member 115 with respect to the fixed lugs of the plate 32. The amplitude of such oscillations is controlled by the size and capacity of the springs 113.

Adjacent the inner end of the sun gear, that is the end adjacent the bearings 42, we provide a control member 116 which has an internal toothed portion 117 meshing with the external teeth 97 of the sun gear. The member 116 is provided with an axially offset radially extending portion providing intermittent cam surfaces and recesses, the cam surfaces being indicated at 118 and the recesses being indicated at 119. The member 116 is adapted to extend between the depending end flange portion 120 of the member 115 and the inner hub portion 122 of the member 32. Surrounding the hub portion of the member 116 and bearing against the inner face of the inwardly extending end flange of the member 115 is a split spring member 123 formed at one end with a radially extending projection 124. This member is in friction engagement with the annular surfaces of the member 116 in such manner that it tends to rotate with this member and the radially extending portion 124 is normally disposed adjacent to and projecting into a radially extending slot 125 formed in the face of one of the extending lug portions 114 of the member 115, as shown more clearly in Figure 5.

The housing 13 is provided with a lateral extension 126 which, as indicated more clearly in Figure 4, projects outwardly at an angle to one side of the transmission. This extension provides a support for an adjustable spring plunger 127 extending therethrough and which is normally pressed inwardly of the housing by means of a spring 128 controlled by the adjustable cap 129 threaded to the outer end of the bushing 130. The spring 128 is adapted to bear against the outer end of a locking pawl 132 shown clearly in Figures 4 to 6.

The pawl 132 is provided with a recess 133 in one lateral face thereof which recess is adapted to receive a pin or roller 134 carried by a longitudinally shiftable arm 135 having sliding movement in a recessed portion 136 of the adapter plate 32. At its outer end the arm 135 is provided with a normally extending ear 137 engageable by the rounded end 138 of a bell crank lever 139 pivotally supported on the pin 140 carried by a bracket arm 142 supported by means of a clamping portion embracing the adjustable cap 129. A bell crank lever 143 having one end thereof provided with a locking notch 144 adapted to engage the pin or stud 145 of the lever 139 when rotated in a clockwise direction to raise the arm 135, is pivotally mounted on an offset portion of the bracket 142.

The lever 139 is rocked about the pivot 140 by means of the cable 146 secured thereto by the nut 147 and extending through the flexible conduit 148 to the instrument board 7, the cable and terminating in a control button 149 projecting through the instrument panel. By pulling on the button 149 the arm 139 is rotated in a clockwise direction, raising the arm 135 and thereby moving the pawl 132 upwardly against the pressure of spring 128. This moves the pawl 132 from the position shown in Figure 4 to that shown in Figure 5, disengaging the pawl from one of the locking recesses 119 in which it is normally seated. It will be noted that there is no positive connection between the arm 135 and the lever 139 or between the pawl 132 and the roller 134 so that upon release of the lever 139 to the position shown in Figure 6 the arm 135 is free to move downwardly by reason of the engagement with the pawl 132, the pawl being urged inwardly by the plunger 127 under the influence of the spring 128.

When the lever 139 is rotated into position to withdraw the pawl 132 from the notch 119 of the member 116, the pin 145 becomes latched in the notch 144 of the bell crank 143, which at its opposite end has sliding engagement upon the rod 150 and is normally held in position against the stop 152 by means of the spring 153. The rod 150 is pivotally connected at its opposite end to an arm 154 formed integrally with or rigidly secured to the clutch arm 18. It will therefore be apparent that upon depressing the clutch pedal 17 the rod 150 will be pulled to the right as shown in Figure 6 and the washer 155 carried on the end thereof will engage the end of the bell crank 143 and raise the notch 144 out of engagement with the pin 145. Thus, the operator upon depressing the clutch pedal is able to press the button 149 on the instrument panel inwardly and move the lever 139 into its normal operative position shown in Figure 6. This releases the arm 135 for inward movement under the influence of pawl 132 and spring 128.

It will be noted that when the pawl 132 is in the position shown in Figure 4 it effectively locks the member 116 to the oscillating member 115 and consequently holds the sun gear 96 against rotation since the oscillating member 115 is confined against rotation by the interengagement of the lugs 114 and 110. The springs 113 serve as torque vibration dampeners inasmuch as under normal driving conditions the member 115 is urged in a clockwise direction as viewed in Figures 4 and 5 and tends to compress the springs on the forward side of the lugs 114. However, when the propeller shaft speed exceeds the speed of the engine or when a coasting condition occurs, the member 115 has a tendency to rock in the opposite direction but is cushioned by means of the opposite springs 113. By locking member 116 to the member 115 the sun gear is held from rotation and consequently the planetary gear system is effective when the free wheeling sleeve 68 is in shifted position to provide an overdrive from the shaft 40 through the planetary system to the sleeve 68 and member 52 into the propeller shaft 16. Under such conditions the engine speed is, of course, reduced and consequently a smoother and quieter ride is provided. However, it may be desirable to obtain acceleration characteristics of the vehicle in order to pass a slower moving vehicle and under such circumstances it is desirable to release the sun gear for rotation to thereby effect conventional direct drive through the transmission.

In order to describe the various operations incident to the use of the present invention it should be first assumed that when the vehicle is ready for operation the control button 83 is pushed in which results in counterclockwise movement of the arm 75 and consequently builds up energy in the spring 77 tending to move the free wheeling clutch sleeve 68 to the latch as shown in Figure 2. Upon conventional shifting movement of the gear lever 27 and disengagement of the clutch operated by the shaft 25 the free wheeling sleeve 68 is free to move from clutched position between members 48 and 52 into unclutched position whereby the member 48 is not coupled to the member 52 in any manner except through the overrunning anti-friction members 50. This moves the sleeve 68 into position such that the pawls 103 are free to move outwardly radially into the openings 106.

The spring tension on the pawls 103 is so arranged that when the vehicle assumes a speed of approximately 40 miles an hour or a similar desired cut-in speed and the accelerator is momentarily released, the propeller shaft speed will become substantially the same as the engine speed or even slightly exceed engine speed. The pawls 103 then move outwardly to clutch the sleeve 68 to the housing 102 and consequently to the planetary gear system including the member 98, pinions 94 and sun gear 96. Since the sun gear is at this time in locked position the pinions 94 serve to drive the internal gear member 98 at a higher rate than the speed of rotation of the shaft 40 and hence through the sleeve 68 impart a higher speed of rotation to the member 52 and consequently to the propeller shaft. The vehicle is now in overdrive with the engine speed being below the vehicle speed.

If it is desired to gain the advantages of the acceleration characteristics of a conventional direct drive the operator merely pulls out the control button 149 which moves the arm 139 in a clockwise direction thereby raising the pawl 132 and releasing the locked engagement between the members 116 and 115. As a result, the member 116 tends to rotate in a clockwise direction relative to the member 115 and consequently moves the end 124 of the ring 123 from one side of the slot 125 to the opposite side in which position it engages beneath the lower end 160 of the pawl 132 and holds the pawl against the pressure of the spring 128. This releases the sun gear from its fixed position and consequently prevents the transmission of rotative force to the member 98 through the pinions 94. As a result, the sun gear, pinions and internal gear 98 as well as the sleeve 68 rotate as a mass with no transmission of torque therethrough and the only torque transmission effective on member 52 is from member 48 through the overrunning clutch 50. Under such circumstances the transmission is in direct drive with the free wheeling mechanism in operative position and consequently the full acceleration characteristics of the vehicle can be obtained.

When the operator desires to return to overdrive he depresses the clutch pedal which releases the pin 145 from notch 144 of the arm 143 and then pushes in the control button 149 on the instrument board. This results in removal of the end 138 of the lever 139 from engaging position and frees the arm 135 for inward movement. The pawl 132 is thereby also freed for inward movement under the influence of spring 128 but is prevented from such movement by reason of the engagement of the end 124 beneath the end 160 of the pawl 132. However, a slight release of the accelerator pedal results in a coasting effect being imparted to the transmission by the overrunning of the propeller shaft with respect to the engine shaft and as a result the member 115 tends to rotate in a counterclockwise direction with respect to the adapter plate 32 and consequently produces rotation of the ring 123 which removes the end 124 from beneath the end 160 of the pawl 132 and into alinement with the cut away portion 162 of the pawl, thereby freeing the pawl for inward movement.

It will be remembered that during this time the sun gear, the planetary gear and the sleeve 68 are rotated as a unit and consequently the member 116 is rotated therewith by reason of its meshing engagement with the teeth of the sun gear. As a result, the cam surfaces 118 of the member 116 engage the inner surface of the pawl 132 until such time as the sun gear assumes a speed substantially synchronous with the speed of the shaft 40. At this time the relative movement of the cam surfaces 118 with respect to the pawl 132 is negligible and as any one of the recesses 119 moves into position the spring 128 will force the pawl down into the notch 119 to thereby lock the sun gear against rotation by the locking of the member 116 to the member 115. Depression of the accelerator pedal after this has occurred will result in the car being driven through the correct overdrive planetary system.

It will thus be apparent that with the present construction the operator has complete control over the overdrive mechanism and is able to engage and disengage the same at any desired traffic speed when it is advantageous to employ the acceleration characteristics of the vehicle. This is of distinct advantage over prior constructions in which overdrive could not be disengaged without dropping the speed of the vehicle down below a predetermined cut-in speed of the mechanism.

Also, it gives the operator a definite assurance of the particular condition of the transmission since he is capable of ascertaining positively when the car is in overdrive and when he has shifted the same into conventional drive by operation of the button 149. It will be noted that whenever the overdrive mechanism is in use or is adapted for use it is necessary that the free wheeling clutch be in free wheeling position since it cannot be restored to clutching position except when the pawls 103 are not rotating at a speed sufficient to withdraw them from the openings 106. Consequently, at all speeds at which the overdrive is effective the car is in free wheeling and it is impossible to shift it out of free wheeling during this time. Also, it is necessary to initially set the free wheeling mechanism for operation if it is desired to provide for overdrive at cruising speeds.

The present invention also employs certain novel features tending toward more efficient lubrication of the various bearings and engaging portions of the mechanism. For example, it will be noted that the portion 46 of the drive shaft 40 is provided with a spiral rib which tends to force lubricant axially along the shaft and to discharge the same outwardly for lubrication of the bearings 42. At the same time, a portion of the lubricant can pass through a circumferentially spaced series of openings 165 in the member 116 and through the retaining cap 166 is directed into the interior of the pinion shafts 93 and thus can be discharged radially into the bearing assembly supporting the pinions 94 on these shafts. It will be further noted that the bronze bushing 167 between the planetary housing 92 and the pawl housing 102 is lubricated by the axial ports in the stub shafts 93.

It is believed that the present invention provides a simple mechanism for effecting positive mechanical control of the overdrive mechanism of a transmission which can be readily assembled and installed in position and which with the overdrive mechanism can be adapted for use with any conventional type of transmission. Further, it is apparent that the reengagement of the locking pawl between the members 115 and 116 is dependent only upon the more or less synchronous alinement of these members and cannot be forced into position due to the lack of interconnection between the lever 139 and the arm 135 and between the arm 135 and the pawl 132. In other words, inward movement of the pawl 132 under the influence of the spring 128 is controlled solely by conditioning of the parts into proper alinement by reason of their relative speed relationships.

It should also be pointed out that the contour of the cams 118 and the camming surfaces of the pawl 132 as well as the buffer action of the springs 113 result in an overdrive mechanism and control therefor which is not subjected to clicking or clashing of gears during operation.

We are aware that a number of changes in details of construction and arrangement of the parts is possible without, however departing from the underlying principles of the present invention and we therefore do not intend to limit our invention except as defined by the scope and spirit of the appended claims.

We claim:

1. In a transmission having an overdrive mechanism including a sun gear, a fixed adaptor plate secured to said housing, a member confined for limited oscillation with respect to said plate, a locking member fitting in said oscillating member and having fixed meshing engagement with said sun gear, cam recesses formed in the periphery of said locking member, a pawl slidable radially in said oscillating member and normally seating in one of said recesses, and remotely disposed control means for selectively withdrawing said pawl from said recess to release said sun gear for rotation.

2. In a transmission having an overdrive mechanism including a sun gear, means normally locking said sun gear against rotation, remotely controlled manually operable latch means for releasing said sun gear for rotation, and pedal controlled means for disengaging said latch means to condition said locking means for reengagement to hold said sun gear against rotation.

3. In a transmission having an overdrive mechanism including a sun gear, a cam member secured to said sun gear, pawl means normally holding said cam member against rotation, a pivotally mounted bell crank on said transmission manually operable to disengage said pawl means from said cam member, latching means for locking said bell crank in operated position, and pedal controlled means for releasing said bell crank.

4. In a transmission having an overdrive mechanism including a sun gear, a cam member locked to said sun gear, a coaxial oscillating member mounted for limited oscillation relative to a fixed part of said transmission, a pawl normally held in interlocked position between said members, a bell crank lever pivotally mounted on the external portion of said transmission, means interconnecting said bell crank and pawl for releasing movement only of said pawl, and remotely disposed means for rocking said bell crank in opposite directions to withdraw said pawl and to condition said pawl for reengagement in interlocked position.

5. In combination with a transmission having a free wheeling mechanism and an overdrive mechanism, a clutch for said transmission, a clutch for controlling said free wheeling mechanism and adapted to condition said overdrive mechanism for operation upon movement into free wheeling position, remotely disposed means operative to shift said second clutch to free wheeling position upon disengagement of said first clutch, means for rendering said overdrive mechanism inoperative independently of said second clutch, remotely disposed means for actuating said last-named means, latching means for locking said actuating means in actuated position, and means operatively actuated by disengagement of said first clutch for releasing said latching means.

6. Control means for an overdrive transmission having a sun gear normally locked against rotation, comprising a locking pawl interlocking said gear to a fixed part of said transmission, means for raising said pawl to gear releasing position, remotely disposed means manually operable to actuate said raising means in raising direction only, latching means for automatically locking said manually operable means in actuated position, pedal controlled means for releasing said latching means to condition said pawl for reengagement and means associated with said sun gear for permitting reengagement of said pawl upon actuation of said manually operated means in the direction opposite to its first movement.

7. Control means for the overdrive mechanism of a vehicle transmission comprising a control button on the instrument panel of the vehicle, a pawl normally urged into position to render said overdrive mechanism operative, lever means for moving said pawl into inoperative position, flexible motion transmitting means between said button and said lever means for actuating the same, means locking said lever means in actuated position, and remotely controlled means for releasing said locking means.

8. In combination, a transmission having overdrive mechanism therein, a spring pressed pawl normally locking said mechanism in operative position, manually operable means for moving said pawl into inoperative position, primary automatically operated means in said overdrive mechanism for restraining said pawl in inoperative position, secondary latching means for locking said pawl-moving means in actuated position, manually controlled means for releasing said secondary latching means to condition said pawl for movement into operative position, and means associated with said overdrive mechanism for actuating said primary restraining means to release said pawl for operative movement and controlled in accordance with predetermined torque relationships in said transmission.

9. In combination, in a vehicle including a transmission, a clutch, clutch operating means, and an instrument panel, an overdrive mechanism associated with said transmission and including a sun gear, means normally holding said gear against rotation, means controlled from said panel for releasing said sun gear for rotation, means automatically latching said releasing means in actuated position, and means controlled by said clutch operating means for unlatching said releasing means to provide for reengagement of said holding means.

10. In a transmission having an overdrive mechanism including a sun gear, means normally locking the sun gear against rotation, remotely controlled means for actuating said locking means to sun gear releasing position, blocking means for holding said locking means in said last-named position, and pedal-controlled means operable to render said blocking means inoperative to condition said locking means for reengagement to hold the sun gear against rotation.

11. In a transmission having an overdrive mechanism including a sun gear, pawl means normally urged into position to lock said sun gear against rotation, means operable to move said pawl means into sun gear releasing position, remotely disposed control means for said last-named means, and pedal controlled means operable to condition said pawl means for reengagement to lock said sun gear against rotation.

12. In a transmission having a conventional change speed mechanism and overdrive mechanism, said overdrive mechanism including a sun gear and a set of planetary gears, means for locking said sun gear against rotation, remote control means adapted to be operated independent of the power source of the transmission for releasing said first means to permit said sun gear to have conjoint rotation with said set of planetary gears, and pedal controlled means operable to permit said remote control means to be operated to permit said first means to lock said sun gear against rotation.

13. In a transmission having a conventional change speed mechanism and overdrive mechanism, said overdrive mechanism including a sun gear and a set of planetary gears meshing therewith, a locking member carried by said sun gear, a radially movable pawl for selectively engaging said locking member to hold said sun gear against rotation, remote control means adapted to be operated independent of the power source of the transmission for releasing said locking means to permit said sun gear to have conjoint rotation with said planetary gears, and pedal controlled means operable to permit said remote control means to be operated to permit said pawl to lock said sun gear against rotation.

14. In a transmission having a conventional change speed mechanism and overdrive mechanism, said overdrive mechanism including a sun gear and a set of planetary gears meshing therewith, a slotted member carried by said sun gear, a radially movable pawl for selectively engaging with said slotted member to sold said sun gear against rotation, remote control means adapted to be operated independent of the power source of the transmission for releasing said pawl to permit said sun gear to have conjoint rotation with said set of planetary gears, and means operated by a clutch pedal to permit said remote control means to be operated to permit said pawl to lock said sun gear against rotation.

ORVILLE K. BUTZBACH.
HAROLD E. CHURCHILL.